United States Patent
Vettese et al.

(10) Patent No.: US 8,128,363 B2
(45) Date of Patent: Mar. 6, 2012

(54) WIND FLAP BRAKE ASSEMBLY FOR WIND TURBINE

(75) Inventors: Sharolyn Vettese, North York (CA); Alfred Mathieu, North York (CA)

(73) Assignee: Wind Simplicity Inc., North York, Ontario (CA)

( * ) Notice: Subject to any disclaimer, the term of this patent is extended or adjusted under 35 U.S.C. 154(b) by 919 days.

(21) Appl. No.: 12/164,510

(22) Filed: Jun. 30, 2008

(65) Prior Publication Data
US 2009/0208334 A1  Aug. 20, 2009

Related U.S. Application Data

(60) Provisional application No. 61/028,921, filed on Feb. 15, 2008.

(51) Int. Cl.
*F03D 7/02* (2006.01)
(52) U.S. Cl. .......................................... 416/13; 416/41
(58) Field of Classification Search ................ 416/9–17, 416/40–41
See application file for complete search history.

(56) References Cited

U.S. PATENT DOCUMENTS

| | | | | |
|---|---|---|---|---|
| 1,698,709 A * | 1/1929 | Bucklen et al. | ................. | 416/13 |
| 3,667,861 A * | 6/1972 | Parish | ............................. | 416/14 |
| 4,403,916 A * | 9/1983 | Skelskey | ........................ | 416/14 |
| 4,787,819 A * | 11/1988 | Bond | .............................. | 416/15 |
| 5,436,508 A * | 7/1995 | Sorensen | ........................ | 290/55 |
| 2009/0016887 A1 | 1/2009 | Vettese et al. | | |
| 2009/0104039 A1 | 4/2009 | Vettese | | |

* cited by examiner

*Primary Examiner* — Matthew W Such
(74) *Attorney, Agent, or Firm* — Shoemaker and Mattare

(57) ABSTRACT

A brake assembly for use with a wind turbine. The brake assembly comprises a movable wind flap for attachment to a tail assembly of the wind turbine, the wind flap being configured to assume a first closed position during normal operation, and a second open position when incoming winds exceed a predetermined velocity threshold. Provided on the wind flap is a trip rudder assembly for cooperating with incoming wind to urge the wind flap into the open position. A counterbalance assembly is also provided for biasing the wind flap into the closed position. The wind flap in the open position effects a redirection of a portion of the incoming wind, urging the wind turbine to assume an oblique position relative to the incoming wind, effecting a reduction in rotational velocity of the wind turbine.

14 Claims, 5 Drawing Sheets

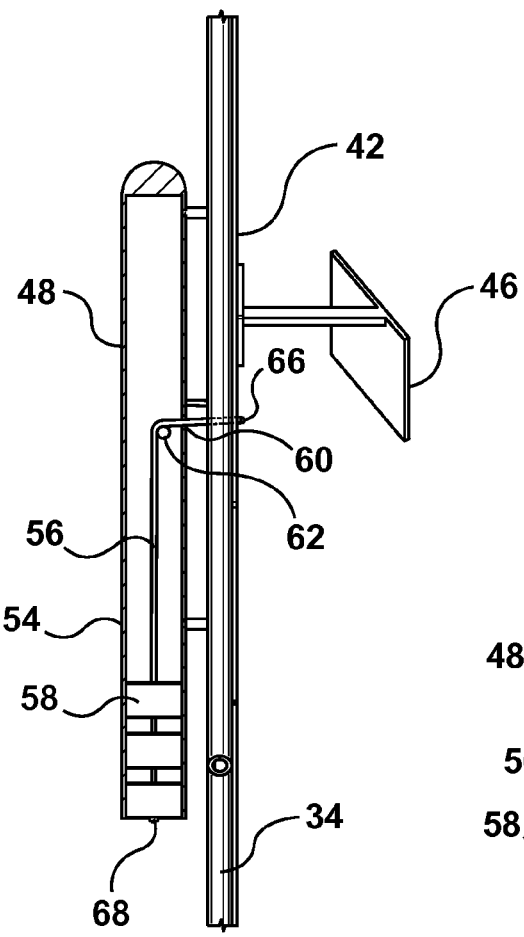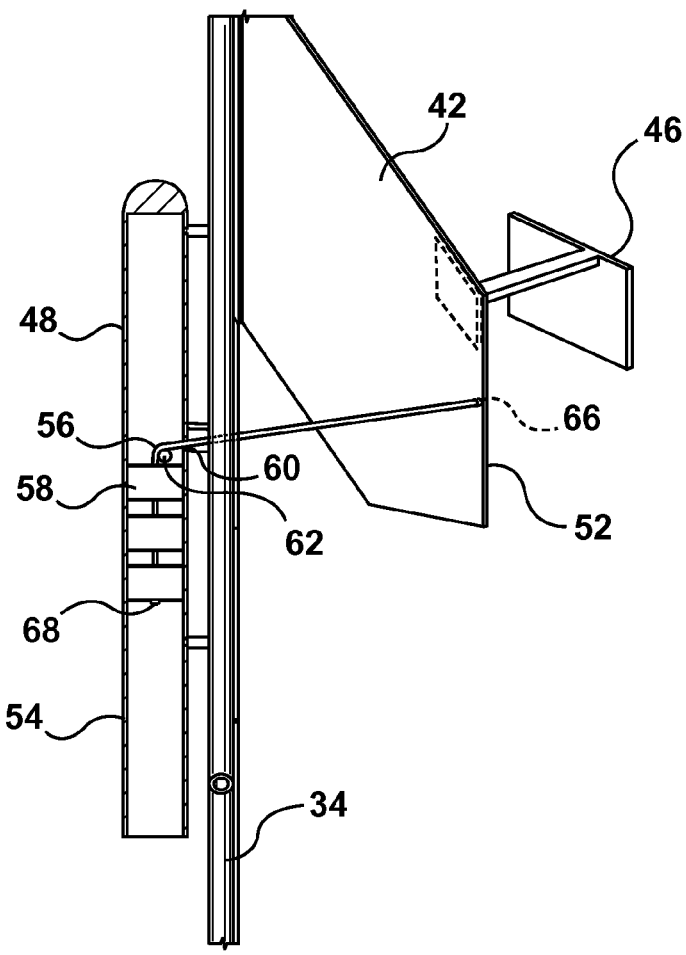
FIG. 3a
FIG. 3b

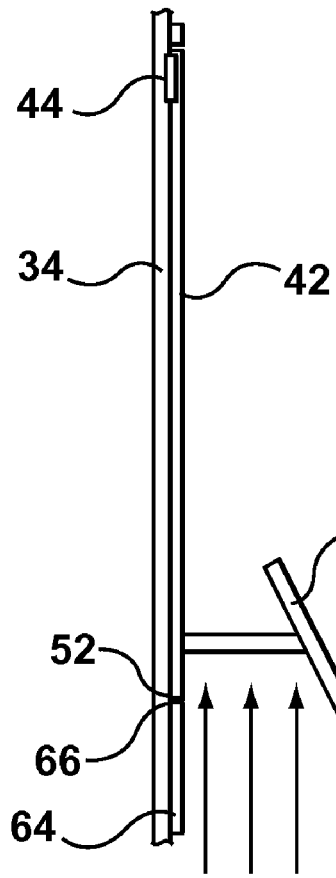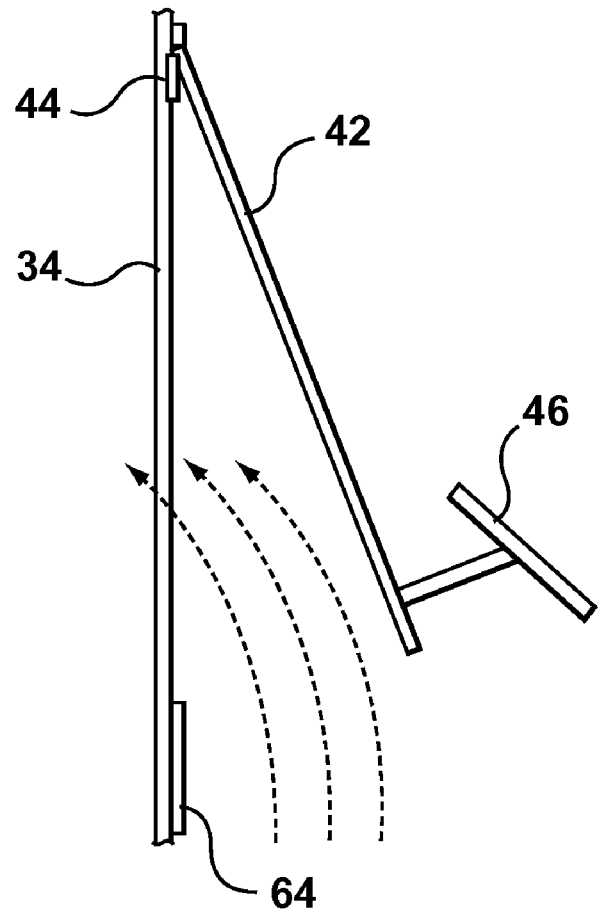
FIG. 4a                    FIG. 4b

WIND FLAP BRAKE ASSEMBLY FOR WIND TURBINE

This application claims benefit of U.S. Provisional Application No. 61/028,921, filed on Feb. 15, 2008.

FIELD

The present invention pertains to a brake assembly, and in particular to a wind flap brake assembly for use with wind turbines.

BACKGROUND

Wind is a powerful renewable energy source that civilizations have harnessed to varying degrees for several thousand years. Historians accredit ancient Mesopotamia and Egypt as giving rise to sail-based propulsion systems for boats, while most accounts accredit ancient Persia as having developed and implemented windmills in 500 to 900 AD. In around 1390, the Dutch began to refine the windmill, eventually implementing thousands for various applications such as irrigation, land drainage, grain-grinding, saw-milling and the processing of commodities.

With the current awareness of global warming and the human impact upon the environment, there is an increasing shift towards greener, ecologically-friendly technologies. While fossil fuel-fired and nuclear powerplants have been standard methods of power generation for the last century, alternative methods for power generation, particularly from renewable energy sources such as the sun and wind have been attracting increasing attention from industry, governments and the general public.

Modern windmills for power generation are growing in popularity, with wind farms being established in many countries around the world. Modern windmills come in a variety of sizes and configurations, but many associate windmills with the large horizontal wind turbines used for large scale energy generation. These large turbines can stand as tall as 90 meters, with generally three equidistantly spaced blades measuring upwards of 30 meters each. More recently, however, there is growing interest for smaller turbine units that are better suited to farm and residential application.

On most horizontal wind turbines, there is a control that slows down or completely stops the rotation of the wind blades during higher than anticipated wind velocity.

The traditional "wheel vane" windmill that was used primarily for pumping water, and still in operation today, is a classic example of rotating the body of the windmill oblique to the wind to attain a complete stoppage of the "wheel vane". The foregoing cut-off system, located at the top of the windmill, consists of a centrifugal set up of weights such that when its rotation is increased, the weights expand outward and strikes a lever that releases the spring loaded wind vane. The wind vane then rotates parallel to the "wheel vane" which stops the windmill rotation completely. It is necessary to manually reload the centrifugal weight system so that the wind vane is again at right angles to the "wheel vane". The windmill does not automatically reset into an operating configuration.

The modern brake system for reducing rotational velocity can consist of either a "disk" or "drum" assemblage or an "generator/alternator" reverse technology. The "disk" or "drum" assemblage can be activated remotely by a wired or wireless mechanism. However, there is greater wear on the brake pads if the wind blades remain at right angles to the wind, resisting the braking mechanism. The "generator/alternator" reverse technology is automatically applied when the torque on the wind blades is exceeded. With this technology, the rotor rotating inside the stator of the alternator has the ability to act as a brake.

Both braking systems may be used simultaneously, rotating the body of the wind turbine oblique to the wind, and when rotation is decreased, using the "disk" or "drum" brakes to completely stop the rotation of the wind blades. There is no existing mechanism whose sole purpose is to slow down the wind blades, without complete stoppage.

With smaller wind turbines that are constructed for residential or farm use, it is preferable to use a simpler braking mechanism than those described above.

SUMMARY

According to an aspect, provided is a brake assembly for use with a wind turbine, the brake assembly comprising, a movable wind flap for attachment to a tail assembly of the wind turbine, the wind flap being configured to assume a first closed position, and a second open position, a trip rudder assembly attached to the wind flap for cooperating with incoming wind to urge the wind flap into the open position, a counterbalance assembly attached to the wind flap for biasing the wind flap into the closed position, wherein the wind flap in the open position effects a redirection of a portion of the incoming wind, urging the wind turbine to assume an oblique position relative to the incoming wind, effecting a reduction in rotational velocity of the wind turbine.

In some embodiments of the brake assembly, the wind flap is attached to the tail assembly using a hinge.

In some embodiments of the brake assembly, the wind flap comprises a trailing edge and a leading edge, the wind flap being attached to the tail assembly along the trailing edge using the hinge.

In some embodiments of the brake assembly, the counterbalance assembly comprises a housing attached to the tail assembly, a counterbalance cable, and at least one calibrated weight, the counterbalance cable being disposed within the housing and being attached at one end to the wind flap and being operably associated at an opposite end with the at least one calibrated weight, the at least one calibrated weight being moveable along a longitudinal axis defined by the housing.

In some embodiments of the brake assembly, the trip rudder assembly comprises a mounting post and a trip rudder, the mounting post being affixed at one end to the wind flap in the vicinity of the leading edge and having positioned at an opposite end the trip rudder.

In some embodiments of the brake assembly, the trip rudder is positioned at an angle relative to the wind flap, the angle being approximately 30° to approximately 35°.

In some embodiments of the brake assembly, the wind flap assumes the second position when the incoming wind exceeds a predetermined wind velocity threshold.

In some embodiments of the brake assembly, the wind flap is configured to lie flat and generally parallel to the tail assembly when the wind flap is in the first closed position.

In some embodiments of the brake assembly, the leading edge of the wind flap is configured to open up to 15 cm from the tail assembly.

According to a further aspect, provided is a wind turbine rotatable to align with incoming wind, the wind turbine comprising, a generator;

a rotor assembly having arranged thereon a plurality of blades, the rotor assembly being operably mounted on the generator, a tail assembly operably associated with the generator, the tail assembly having located thereon a brake assembly comprising a movable wind flap for attachment to the tail assembly, the wind flap being configured to assume a first closed position, and a second open position, a trip rudder assembly attached to the wind flap for cooperating with incoming wind to urge the wind flap into the open position, a counterbalance assembly attached to the wind flap for biasing the wind flap into the closed position, wherein the wind flap in the open position effects a redirection of a portion of the incoming wind, urging the wind turbine to assume an oblique position relative to the incoming wind, effecting a reduction in rotational velocity of the wind turbine.

In some embodiments of the wind turbine, the wind flap is attached to the tail assembly using a hinge.

In some embodiments of the wind turbine, the wind flap comprises a trailing edge and a leading edge, the wind flap being attached to the tail assembly along the trailing edge using the hinge.

In some embodiments of the wind turbine, the counterbalance assembly comprises a housing attached to the tail assembly, a counterbalance cable, and at least one calibrated weight, the counterbalance cable being disposed within the housing and being attached at one end to the wind flap and being operably associated at an opposite end with the at least one calibrated weight, the at least one calibrated weight being moveable along a longitudinal axis defined by the housing.

In some embodiments of the wind turbine, the trip rudder assembly comprises a mounting post and a trip rudder, the mounting post being affixed at one end to the wind flap in the vicinity of the leading edge and having positioned at an opposite end the trip rudder.

In some embodiments of the wind turbine, the trip rudder is positioned at an angle relative to the wind flap, the angle being approximately 30° to approximately 35°.

In some embodiments of the wind turbine, the wind flap assumes the second position when the incoming wind exceeds a predetermined wind velocity threshold.

In some embodiments of the wind turbine, the wind flap is configured to lie flat and generally parallel to the tail assembly when the wind flap is in the first closed position.

In some embodiments of the wind turbine, the leading edge of the wind flap is configured to open up to 15 cm from the tail assembly.

In another aspect, provided is a method of reducing the rotational velocity of a wind turbine, the method comprising the steps of:

establishing a predetermined threshold of wind velocity at which a reduction in rotational velocity is warranted;

triggering a redirection of a portion of incoming wind at wind speeds achieving and exceeding the predetermined wind velocity;

rotating the wind turbine to an oblique position relative to the incoming wind;

automatically returning the wind turbine to an optimal operating position at wind speeds less than the predetermined wind velocity.

These and other features of the applicant's teachings are set forth herein.

BRIEF DESCRIPTION OF THE DRAWINGS

Embodiments of the present application will now be described, by way of example only, with reference to the attached Figures, wherein

FIG. 3a is a front view of a tail boom comprising the wind flap brake assembly of FIG. 1, in which the wind flap is in the closed position;

FIG. 3b is a front view of a tail boom comprising the wind flap brake assembly of FIG. 1, in which the wind flap is in the open position;

FIG. 4a is a schematic representation of the trip rudder of the wind flap brake assembly of FIG. 1, in which the wind flap is in the closed position;

FIG. 4b is a schematic representation of the trip rudder of the wind flap brake assembly of FIG. 1, in which the wind flap is in the open position;

DESCRIPTION OF VARIOUS EMBODIMENTS

The wind flap brake assembly described below is suitable for use on a wide range of horizontal wind turbines, such as the horizontal dual-rotor wind turbine described in applicants co-pending U.S. application entitled "ROTOR DRUM" filed Apr. 13, 2007, the contents of which are herein incorporated by reference. The wind flap brake assembly is also suitable for use in concert with a wide range of wind turbine blade configurations, such as the curved blade configuration described in applicants co-pending U.S. application entitled "CURVED BLADE FOR WIND TURBINES" (U.S. application Ser. No. 11/874,508, filed Oct. 18, 2007), the contents of which are herein incorporated by reference.

In general, the wind flap brake assembly is integrated into and forms part of the wind tail assembly. The assembly is engineered to slow down the rotation per minute (rpm) of the wind blades when excessive winds, such as a gust, are encountered by the horizontal wind turbine. At excessive wind speeds, the wind flap is configured to open, thereby diverting the wind, causing the wind turbine to turn obliquely to the wind, thereby slowing down the rotation of the wind blades without stopping them. The extent of opening of the wind flap is controlled by a cable on which there is located an attached calibrated weight(s). The weights serve to establish a threshold above which the wind flap will open. The threshold is generally determined by the maximum rpm of a particular wind turbine system. The weights also serve to automatically close the wind flap after the slow down is achieved.

Figure 1:
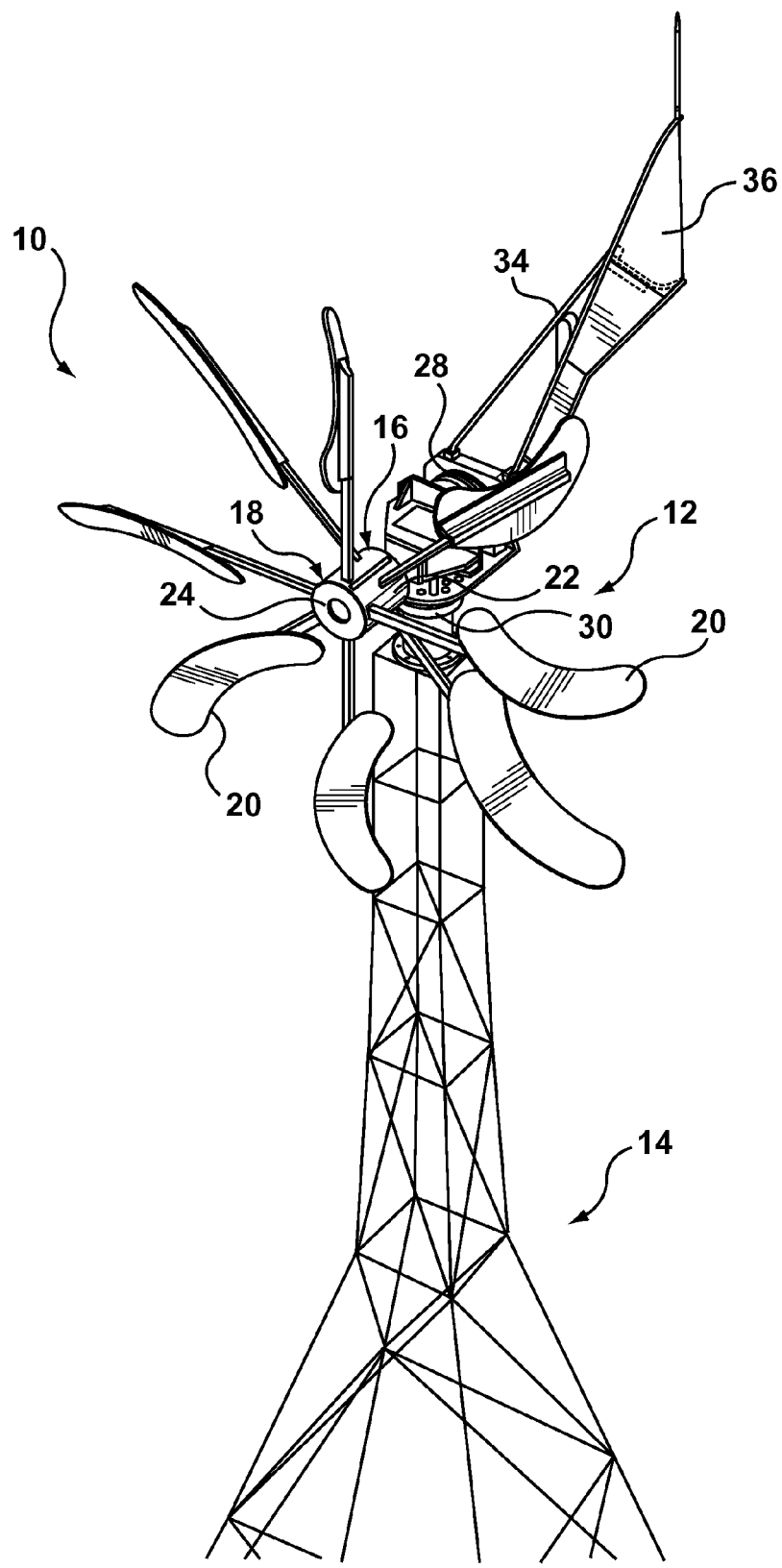
FIG. 1 is a perspective view of a dual rotor horizontal wind turbine on which an embodiment of the wind flap brake assembly has been installed.

Referring now to FIG. 1, shown for exemplary purpose is a horizontal dual-rotor wind turbine, indicated by reference numeral 10. The dual rotor wind turbine 10 generally comprises a wind assembly 12 rotatably mounted on a tower 14.

The wind assembly 12 generally comprises a rotor assembly having arranged thereon a plurality of a equidistantly spaced-apart blades. In the example shown, a dual rotor assembly is provided comprising a primary rotor assembly 16 and an auxiliary rotor assembly 18, each rotor assembly having mounted thereon a plurality of blades 20, the blades being circumferentially equidistantly spaced on respective rotors 22, 24. As shown, both the primary rotor assembly 16 and the auxiliary rotor assembly 18 comprise four blades each, and both assemblies work cooperatively to rotate a common generator shaft from a generator 28 affixed to a rotatable tower hub 30. To enable the wind assembly 12 to rotate relative to the tower 14, and in particular towards the incurrent wind (upwind orientation), the tower hub 30 is provided with a rotatable yaw bearing surface. Rotation of the wind assembly 12 about tower hub 30 is facilitated by a tail assembly mounted downwind of the wind assembly, the tail assembly generally comprising a tail boom 34 and vane 36.

The purpose of the tail assembly is to position the wind turbine, in particular the wind assembly comprising the plurality of blades into an operating plane that efficiently captures and transfers power from the wind to the blades. In this way, the wind turbine is immediately capable of tracking the wind, regardless of the incoming wind trajectory. In some instances, however, it is desirable to direct the wind turbine to assume a position that is offset of the operating plane, so as to reduce the capture and transfer of power from the wind to the blades, such as during periods of damagingly high winds or wind gusts.

The wind flap brake assembly serves to alter the configuration of the tail assembly when the wind velocity reaches a pre-determined threshold. During periods of damagingly high winds, wind gusts or otherwise conditions in excess of the above-mentioned pre-determined threshold, the tail assembly first operates as intended to orient the wind assembly to face directly into the incoming wind. The wind flap brake assembly, mounted on the tail assembly is then triggered by the pre-determined threshold-exceeding incoming wind, thereby triggering the wind flap brake assembly, resulting in an alternate configuration of the tail assembly that directs/rotates the wind assembly away from the optimal operating plane, resulting in a reduced capture and transfer of power from the wind to the blades. This offset from the operating plane has the effect of slowing down the rotation the rotor assembly of the wind turbine, thereby protecting the wind assembly, in particular the alternator under conditions of potentially damaging winds.

Figure 2A:
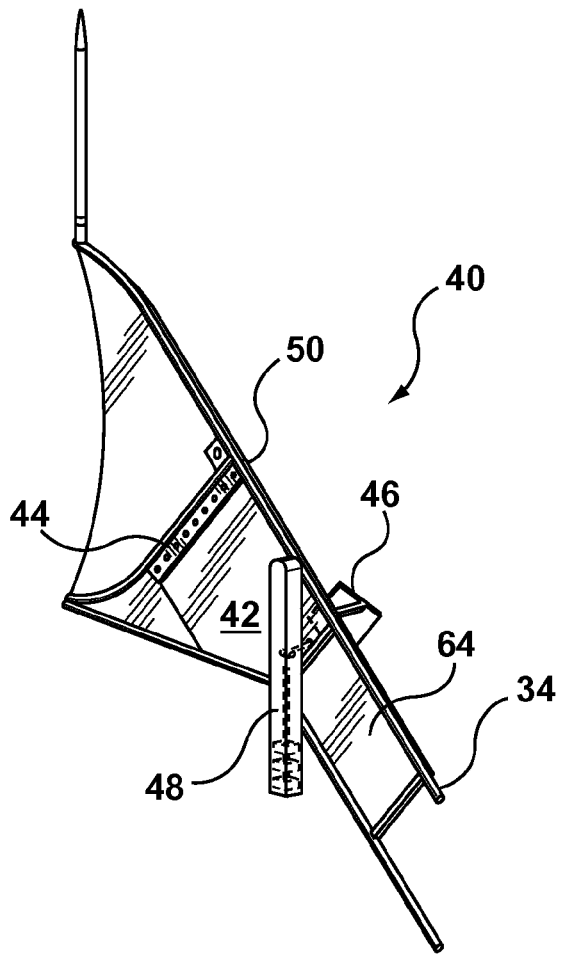
FIG. 2a is a side view of a tail boom comprising the wind flap brake assembly of FIG. 1, in which the wind flap is in the closed position.

The wind flap brake assembly 40 is mounted on the tail assembly as shown in FIGS. 2a (closed) and 2b (open). The assembly 40 comprises a wind flap 42, a hinge 44 to attach the wind flap 42 to the tail assembly, a trip rudder assembly and a counterbalance assembly 48. The trip rudder assembly comprises a mounting post 45 and a trip rudder 46 for activating the wind flap 42. The wind flap 42 is attached to the tail assembly along the wind flap trailing edge 50, using the hinge 44. In this manner, once the leading edge 52 of the wind flap 42 separates from the tail assembly, incoming wind passing through the resulting opening will urge the wind flap 42 into a full open position, as shown in FIG. 2b.

To maintain the wind flap 42 in the closed position under regular operating conditions, the counterbalance assembly 48 is provided. A non-limiting example of a counterbalance assembly 48 is shown in FIGS. 3a and 3b. The counterbalance assembly 48 generally comprises a housing 54, a counterbalance cable 56 and at least one calibrated weight 58. In the embodiment shown, the housing 54 is attached to the tail assembly in a generally vertical orientation, on the opposite side of the tail boom 34 and the wind flap 42, and proximal the wind flap leading edge 52. The counterbalance cable 56 is connected at one end to the wind flap 42, passes through an opening in the housing 54 and is attached at the opposite end to a minimum of one weight 58 contained within the housing 54. The weight 58 located within the housing 54 is movable within the housing 54 along the longitudinal axis defined by the housing 54. The housing 54 can also comprise a suitable bearing surface 60 at the opening, so as to ensure smooth passage and movement of the counterbalance cable 56 relative to the housing 54. The housing 54 is further comprised of an axle stopper 62 that permits the right angle turn of the cable to the wind flap and to establish a limit of travel of the weight 58 contained within the housing 54. An additional stopper can be configured as a feature located on the longitudinal cable within in the housing, between the axle stopper 62 and the top of the weight to easily adjust the width of the wind flap opening. While the cable 56 is described as being attached to the weight 58 within the housing 54, a variety of connectors are possible for establishing a connection there between. For example, at least one weight could be configured to reside on the cable without fixed attachment (e.g. weight is slidable relative to the cable), with the end of the cable within the housing providing or being fitted with a suitable fixture to prevent the weight from falling or sliding off.

Figure 2B:
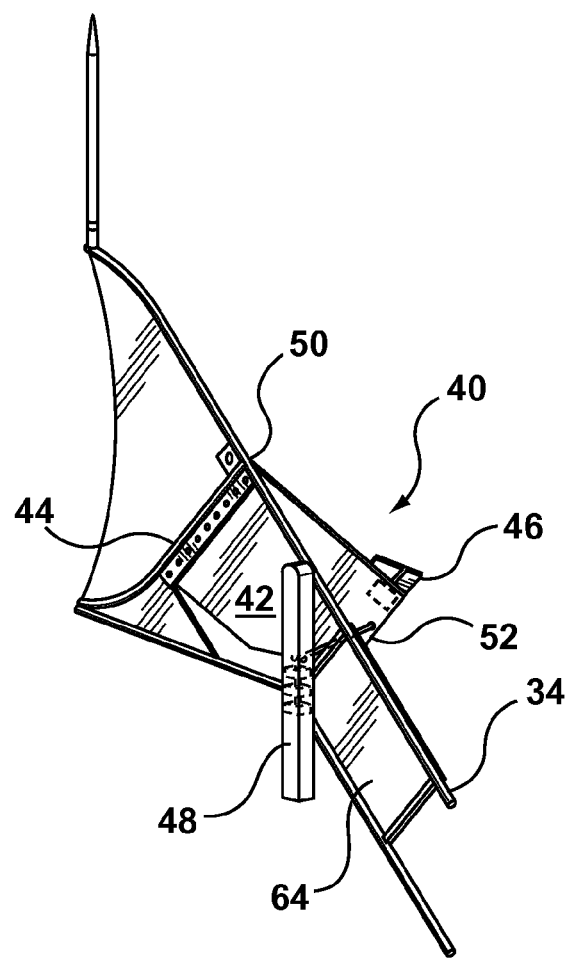
FIG. 2b is a side view of a tail boom comprising the wind flap brake assembly of FIG. 1, in which the wind flap is in the open position.

To trigger the wind flap brake assembly 40, a trip rudder 46 is used as shown in FIGS. 2a and 2b. The trip rudder 46 is attached to the wind flap 42 in the general vicinity of the wind flap leading edge 52, as shown in FIG. 3b (open). The trip rudder 46 is set at an angle such that the passage of wind past the trip rudder 46 has the effect of placing an outwardly directed or opening force upon the wind flap 42, moving the wind flap brake assembly from a closed position, as shown schematically in FIG. 4a, to an open position, as shown schematically in FIG. 4b. In general, the trip rudder 46 is positioned at an angle of approximately 30° to approximately 35° relative to the wind flap.

Given the above construction of an embodiment of the wind flap brake assembly 40, the wind flap 42 is biased into a closed position by way of the counterbalance assembly 48, and is forced into an open position by way of wind acting upon the trip rudder 46. As one will appreciate, the predefined threshold for wind velocity that will trigger the wind flap 42 is dependent upon the amount of weight being used in the counterbalance assembly 48. The more weight used in the counterbalance assembly 48, the higher the wind velocity necessary to trigger the wind flap 42. The upper limit of allowable wind velocity, and thus the weight used in the counterbalance assembly 48 are defined by a number of factors, such as, but not limited to the selected rpm of the alternator.

In the closed position, the wind flap 42 is configured to lie flat and thus generally parallel to the tail boom 34 of the tail assembly, as shown in FIG. 3a. To increase the surface area of the tail assembly, a fixed boom panel 64 can be provided on the tail boom 34 so as to present a substantially contiguous surface when the wind flap 42 is in the closed position (see FIG. 4a). By presenting the substantially contiguous surface, the extent of wind disturbance along the length of the tail assembly can be reduced.

In general, as shown in FIG. 3a and FIG. 3b, the wind flap 42 will open to a maximum of 15 cm from leading edge 52 to the tail boom 34. The extent of opening of the wind flap 42 will depend on a number of factors, such as the length of the counterbalance cable 56, the positioning of stoppers 62 in the counterbalance assembly 48, and the positioning of weights 58 along the counterbalancing cable 56. The counterbalance cable 56 can be attached to the wind flap 42 using an adjustable fixture 66, such that the length of the cable 56 can be readily altered, if necessary. Alternatively, the counterbalance cable 56 can be provided with an adjustable fixture 68 at the opposite end, within the housing 54 that permits the attachment of weights 58, and alteration to cable length as necessary. Both the attachment point to the wind flap 42 and the housing end of the counterbalance cable can be provided with adjustments, in particular the aforementioned adjustable fixtures.

The hinge 44 used to attach the wind flap 42 to the tail boom 34 can take on any number of hinge configurations. For example, the hinge 44 can be of the continuous or 'piano' hinge variety. Alternatively, barrel or pivot-type hinges can be used. One skilled in the art may choose to implement any number of other hinge configurations as deemed suitable for attaching the wind flap 42 to the tail boom 34. One skilled in the art may also choose to implement a pliable hinge comprised of a polymer and/or fabric material.

In use, upon setting up a wind turbine, the wind flap brake assembly is adjusted to activate at a predetermined threshold for wind velocity determined by a pre-determined maximum rpm of the alternator. This is accomplished by placing a predetermined amount of weight 58 on the counterbalance cable 56 within the housing 54 that corresponds to a wind velocity at which the trip rudder 46 will urge the wind flap 42 into an open position.

Figure 5A:
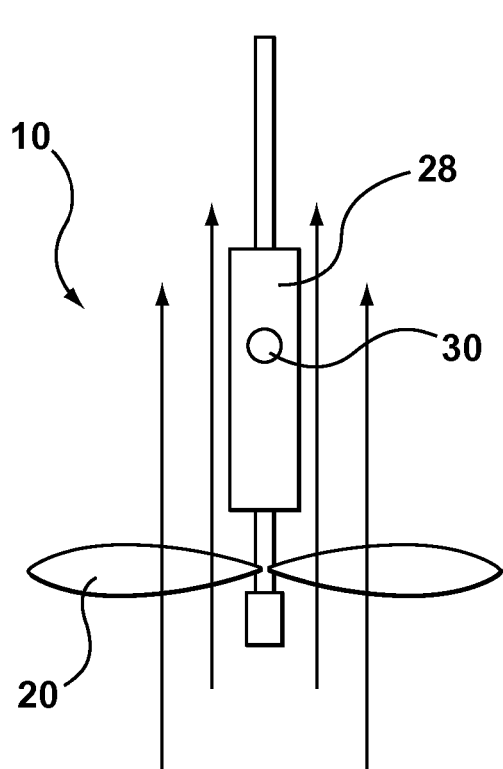
FIG. 5a is a schematic representation of the wind assembly, shown with the wind flap in the closed position, and wherein the wind assembly is aligned with an optimal operating plane relative to the incoming wind.
Figure 5B:
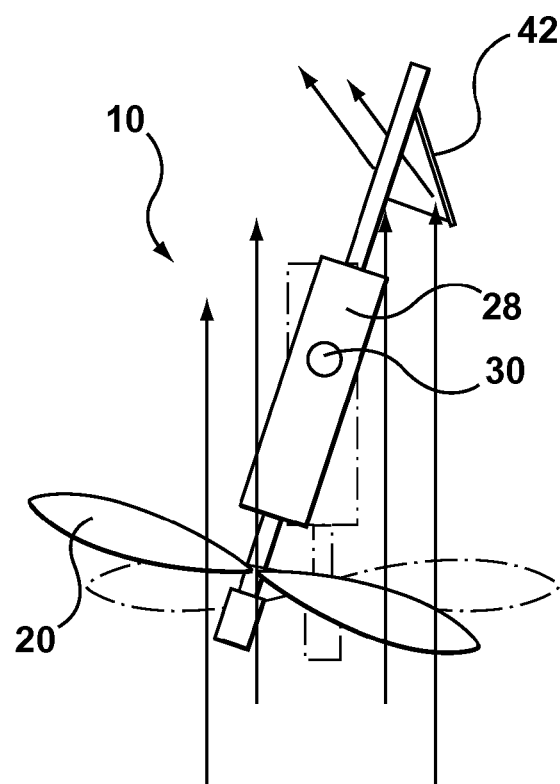
FIG. 5b is a schematic representation of the wind assembly, shown with the wind flap in the open position, and wherein the wind assembly has assumed a position that is off-set relative to the optimal operating place, relative to the incoming wind.

Under normal operating conditions where wind velocities are less than the predetermined threshold, the wind flap 42 remains in the closed position. As shown schematically in FIG. 5a, the wind turbine, and in particular the wind assembly assumes a position corresponding to the optimal operating plane, thereby efficiently capturing and transferring power from the wind to the blades. In the event the wind velocity exceeds the predetermined threshold, the wind acting on the trip rudder 46 creates a opening force that exceeds the closing force established by the counterbalance assembly 48, causing or urging the wind flap leading edge 52 to separate from the tail boom 34. Further opening of the wind flap 42 is facilitated by the wind itself, urging the wind flap 42 into the predetermined open position. With the wind flap 42 in the open position, the dynamics of the wind passing around the tail assembly is altered. The redirection of the wind results in rotation of the wind turbine away from (oblique) to the operating plane, as shown schematically in FIG. 5b causing a reduction in efficiency of wind capture and energy transfer from wind to blades. As a result, the rotational velocity of the rotor assembly is reduced.

When the wind velocity falls below the predetermined threshold, the counterbalance assembly 48 is able to close the wind flap 42, resulting in a tail assembly configuration that moves the wind generator back into alignment of the operating plane of the blades. The wind generator is then able to resume a normal operating state.

In general, the overall method of reduction in rotational velocity of the wind turbine first comprises the establishment of the predetermined threshold of wind velocity at which a reduction in rotational velocity is warranted. Next is the triggering action effected by the trip rudder, resulting in an opening of the wind flap, effecting a redirection of a portion of incoming wind at wind speeds achieving and exceeding the predetermined threshold. The wind turbine then rotates to an oblique position relative to the incoming wind. Once wind velocities fall below the predetermined threshold, the wind flap closes, causing the wind turbine to automatically return to the optimal operating position.

As shown in FIGS. 2a and 2b, the wind flap 42 is located proximal to the vane 36 of the tail assembly. Alternatively the wind flap 42 can be positioned at any point along the tail assembly. For example, the wind flap 42 may be integrated into the vane 36 itself.

Although the present embodiment is discussed/shown using a single wind flap brake assembly, one may implement a plurality of wind flap brake assemblies on a single tail assembly of a wind turbine. On wind turbines comprising multiple tail assemblies, a single or plurality of wind flap brake assemblies may be installed on each tail assembly.

Since the triggering effect of the wind flap 42 is dependent upon the air flow past the trip rudder 46, the wind flap 42 is particularly well suited to wind turbines that have the tail assembly mounted either above or below the horizontal plane defined by the axis of the generator shaft. Nevertheless, the wind flap brake assembly can be implemented on any configuration of tail assembly, including tail assemblies that lie generally along the aforementioned horizontal plane.

Although described above with reference to use on a wind turbine, the wind flap can also be applied to other applications in which a mechanical triggering effect is required in instances where a predetermined wind velocity is exceeded. For example, in mining applications where it is necessary to control downhole air pressure, considerable wind velocities may occur in the exhaust vents. In instances where wind velocities exceed a predetermined threshold, it can be advantageous to enhance the exhaust of air pressure by effectively increasing the exhaust area. To achieve this, where wind velocities through the exhaust vents exceed a predetermined threshold, the wind flaps can be used to mechanically open additional ports to effectively increase the exhaust area of the vent. The mechanical operation of additional ports reduces the need for power, having the potential to reduce overall cost.

It will be appreciated that, although embodiments of the wind flap brake assembly have been described and illustrated in detail, various modifications and changes may be made. It will be appreciated that while the wind flap brake assembly has been described with respect to a dual rotor wind turbine, the wind flap brake assembly can be implemented on most any configuration of wind turbine, regardless of the number of rotor assemblies. In addition, while the brake flap assembly has been demonstrated for use on a wind turbine, the technology could also find application for use in other flowable mediums, including but not limited to water and steam. While one embodiment is described above, some of the features described above can be modified, replaced or even omitted. Still further alternatives and modifications may occur to those skilled in the art. All such alternatives and modifications are believed to be within the scope of the invention.

The invention claimed is:

1. A brake assembly for use with a wind turbine, said brake assembly comprising,
    a movable wind flap for attachment to a tail assembly of said wind turbine, said wind flap being configured to assume a first closed position, and a second open position,
    wherein said wind flap is attached to said tail assembly using a hinge and wherein said wind flap comprises a trailing edge and a leading edge, said wind flap being attached to said tail assembly along said trailing edge using said hinge,
    a trip rudder assembly attached to said wind flap for cooperating with incoming wind to urge said wind flap into said open position,
    a counterbalance assembly attached to said wind flap for biasing said wind flap into said closed position,
    wherein said wind flap in said open position effects a redirection of a portion of said incoming wind, urging the wind turbine to assume an oblique position relative to said incoming wind, effecting a reduction in rotational velocity of the wind turbine.

2. The brake assembly of claim 1, wherein said trip rudder assembly comprises a mounting post and a trip rudder, said mounting post being affixed at one end to said wind flap in the vicinity of said leading edge and having positioned at an opposite end said trip rudder.

3. The brake assembly of claim 2, wherein said trip rudder is positioned at an angle relative to said wind flap, said angle being approximately 30° to approximately 35°.

4. The brake assembly of claim 1, wherein said wind flap assumes said second position when said incoming wind exceeds a predetermined wind velocity threshold.

5. The brake assembly of claim 1, wherein said wind flap is configured to lie flat and generally parallel to said tail assembly when said wind flap is in said first closed position.

6. The brake assembly of claim 1, wherein said leading edge of said wind flap is configured to open up to 15 cm from said tail assembly.

7. A brake assembly for use with a wind turbine, said brake assembly comprising
   a movable wind flap for attachment to a tail assembly of said wind turbine, said wind flap being configured to assume a first closed position, and a second open position
   a trip rudder assembly attached to said wind flap for cooperating with incoming wind to urge said wind flap into said open position,
   a counterbalance assembly attached to said wind flap for biasing said wind flap into said closed position,
   wherein said counterbalance assembly comprises a housing attached to said tail assembly, a counterbalance cable, and at least one calibrated weight, said counterbalance cable being disposed within said housing and being attached at one end to said wind flap and being operably associated at an opposite end with said at least one calibrated weight, said at least one calibrated weight being moveable along a longitudinal axis defined by said housing, and
   wherein said wind flap in said open position effects a redirection of a portion of said incoming wind, urging the wind turbine to assume an oblique position relative to said incoming wind, effecting a reduction in rotational velocity of the wind turbine.

8. A wind turbine rotatable to align with incoming wind, said wind turbine comprising,
   a generator;
   a rotor assembly having arranged thereon a plurality of blades, said rotor assembly being operably mounted on said generator,
   a tail assembly operably associated with said generator,
   said tail assembly having located thereon a brake assembly comprising a movable wind flap for attachment to said tail assembly, said wind flap being configured to assume a first closed position, and a second open position,
   wherein said wind flap is attached to said tail assembly using a hinge and wherein said wind flap comprises a trailing edge and a leading edge, said wind flap being attached to said tail assembly along said trailing edge using said hinge,
   a trip rudder assembly attached to said wind flap for cooperating with incoming wind to urge said wind flap into said open position,
   a counterbalance assembly attached to said wind flap for biasing said wind flap into said closed position,
   wherein said wind flap in said open position effects a redirection of a portion of said incoming wind, urging the wind turbine to assume an oblique position relative to said incoming wind, effecting a reduction in rotational velocity of the wind turbine.

9. The wind turbine of claim 8, wherein said trip rudder assembly comprises a mounting post and a trip rudder, said mounting post being affixed at one end to said wind flap in the vicinity of said leading edge and having positioned at an opposite end said trip rudder.

10. The wind turbine of claim 9, wherein said trip rudder is positioned at an angle relative to said wind flap, said angle being approximately 30° to approximately 35°.

11. The wind turbine of claim 8, wherein said wind flap assumes said second position when said incoming wind exceeds a predetermined wind velocity threshold.

12. The wind turbine of claim 8, wherein said wind flap is configured to lie flat and generally parallel to said tail assembly when said wind flap is in said first closed position.

13. The wind turbine of claim 8, wherein said leading edge of said wind flap is configured to open up to 15 cm from said tail assembly.

14. A wind turbine rotatable to align with incoming wind, said wind turbine comprising
   a generator;
   a rotor assembly having arranged thereon a plurality of blades, said rotor assembly being operably mounted on said generator,
   a tail assembly operably associated with said generator,
   said tail assembly having located thereon a brake assembly comprising a movable wind flap for attachment to said tail assembly, said wind flap being configured to assume a first closed position, and a second open position,
   a trip rudder assembly attached to said wind flap for cooperating with incoming wind to urge said wind flap into said open position,
   a counterbalance assembly attached to said wind flap for biasing said wind flap into said closed position,
      wherein said counterbalance assembly comprises a housing attached to said tail assembly, a counterbalance cable, and at least one calibrated weight, said counterbalance cable being disposed within said housing and being attached at one end to said wind flap and being operably associated at an opposite end with said at least one calibrated weight, said at least one calibrated weight being moveable along a longitudinal axis defined by said housing, and
   wherein said wind flap in said open position effects a redirection of a portion of said incoming wind, urging the wind turbine to assume an oblique position relative to said incoming wind, effecting a reduction in rotational velocity of the wind turbine.

* * * * *